United States Patent [19]

Urushiyama

[11] 4,360,191
[45] Nov. 23, 1982

[54] AIR-LEVELING SYSTEM FOR A VEHICLE

[75] Inventor: Goro Urushiyama, Odawara, Japan

[73] Assignee: Honda Giken Kogyo Kabushiki Kaisha, Tokyo, Japan

[21] Appl. No.: 213,482

[22] Filed: Dec. 5, 1980

[30] Foreign Application Priority Data

Dec. 6, 1979 [JP] Japan .............................. 54-169034[U]

[51] Int. Cl.$^3$ ............................................. B60G 19/08
[52] U.S. Cl. ................................... 267/64.16; 280/714
[58] Field of Search ...................... 267/64.16; 280/704, 280/714

[56] References Cited

U.S. PATENT DOCUMENTS

| | | | |
|---|---|---|---|
| 2,955,843 | 10/1960 | Chuba | 280/714 |
| 2,965,389 | 12/1960 | Dietrich | 267/64.16 X |
| 2,969,975 | 1/1961 | Chuba | 267/64.16 |
| 3,071,393 | 1/1963 | Valentine | 280/714 |
| 4,030,777 | 6/1977 | Rabenseifner | 280/714 |

Primary Examiner—Duane A. Reger
Attorney, Agent, or Firm—Irving M. Weiner; Pamela S. Burt; John L. Shortley

[57] ABSTRACT

An air leveling system for a vehicle wherein a check valve is connected between independent front and rear air lines for respectively feeding pneumatic pressure to front and rear shock absorbers. At least when the pneumatic pressure of the rear side shock absorbers is excessively higher than that of the front side shock absorbers, the pneumatic pressure at the rear side is discharged by the check valve to balance the pneumatic pressures at the front and rear sides to thereby hold the vehicle height at a predetermined level. The system provides for automatic correction of imbalance between the vehicle heights at the front and rear sides, particularly when the rear vehicle height is higher.

8 Claims, 5 Drawing Figures

AIR-LEVELING SYSTEM FOR A VEHICLE

BACKGROUND OF THE INVENTION

1. Field of the Invention

The present invention relates to an improved vehicle leveling system of the type in which pneumatic pressure is fed to and discharged from air chambers attached to hydraulic shock absorbers so that the vehicle height may be selectively adjusted to a higher or lower level.

2. Description of Relevant Art

In known pneumatic vehicle leveling systems for selectively adjusting vehicle height, when the pneumatic pressure is fed to or discharged from the air chambers of the hydraulic shock absorbers to thereby adjust the vehicle height, the compressed air is fed from an air source such as a compressor or an air pump through a pipe, a change-over valve and other pneumatic circuitry components, if necessary, to a pair of right and left front shock absorbers and a pair of right and left rear shock absorbers, so as to thus raise the height of the vehicle. On the other hand, when it is desired to lower the vehicle height, the compressed air is discharged from the pipe through a discharge valve and other pneumatic circuitry. However, if for some unusual reason the pneumatic pressure is imbalanced between the shock absorbers of the front and rear wheels, a problem arises in that the vehicle height at the front wheel side is increased whereas the vehicle height at the rear wheel side is decreased, or that the vehicle height at the front wheel side becomes lower than that at the rear wheel side.

The present invention provides an air-leveling system which effectively overcomes the aforesaid problem attendant known vehicle air-leveling systems.

SUMMARY OF THE INVENTION

The present invention provides an air-leveling system for a vehicle having front and rear wheels, comprising shock absorber means for respectively suspending both the front and rear wheels, air source means, air chamber means provided in each shock absorber means, first conduit means for feeding pneumatic pressure from the air source means to the air chamber means of the shock absorber means of the front wheels, and second conduit means for feeding pneumatic pressure from the air source means to the air chamber means of the shock absorber means of the rear wheels. At least one check valve means is connected between the first conduit means and the second conduit means so as to release pressure in the air chamber means of the shock absorber means of the rear wheels when the pressure becomes higher than pressure in the air chamber means of the shock absorber means of the front wheels over a predetermined range of an allowable difference in pressure between them.

An object of the invention is to provide an air leveling system for a vehicle wherein a check valve is connected between independent front and rear air lines for feeding pneumatic pressure to front and rear shock absorbers or the like. In the event that the pneumatic pressure of the rear side shock absorbers is excessively higher than that of the front side shock absorbers, the pneumatic pressure at the rear side is discharged by the check valve to provide a balance between the pneumatic pressure at the front and rear sides. Thereby, the vehicle height is held at a predetermined level at which the imbalance between the vehicle heights at the front and rear sides, particularly when the rear vehicle height is excessively raised to a higher level, is automatically corrected.

Another object of the present invention is to provide an air-leveling system in which the aforesaid balanced leveling function can be attained merely by connecting one or two check valves between the lines for feeding pneumatic pressure to the air chambers of the front and rear shock absorbers or dampers, and thus by employing a minimal number of additional components in a simplified construction.

The above and other objects, details and advantages of the present invention will become more apparent from the following detailed description of preferred embodiments of the invention, when read in conjunction with the accompanying drawings.

DETAILED DESCRIPTION OF PREFERRED EMBODIMENTS

Figure 1:
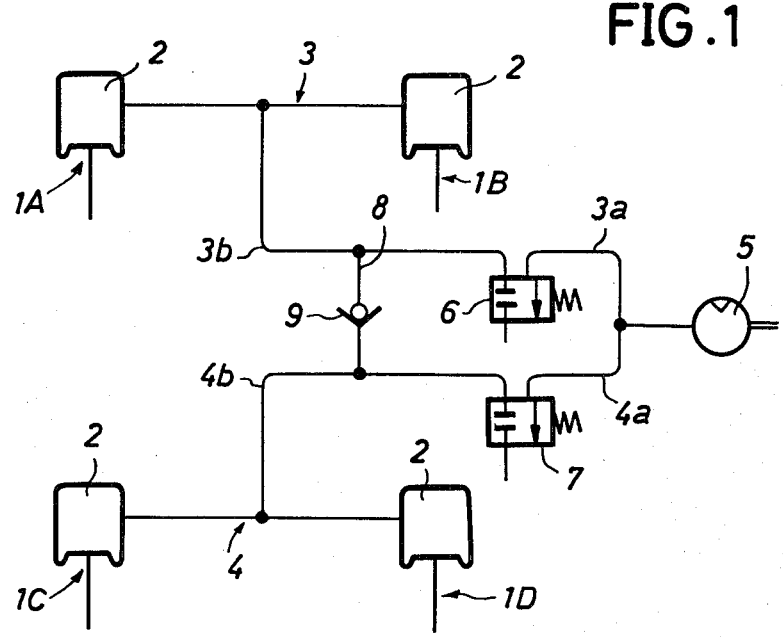
FIG. 1 is a diagrammatic illustration of a pneumatic circuit in accordance with a first embodiment of the present invention.

With reference to FIG. 1, a pneumatic circuit according to a first embodiment of the present invention is shown as operatively connected with four shock absorbers 1A to 1D for suspending and supporting right and left wheels at the front and rear sides of the vehicle, the shock absorbers 1A and 1B being disposed at the front side of the vehicle and the shock absorbers 1C and 1D being disposed at the rear side of the vehicle. The shock absorbers 1A to 1D are each respectively provided with air chambers 2, arranged such that the piston rods of the shock absorbers 1A to 1D are lifted up by feeding compressed air to the air chambers 2 from air lines 3 and 4 so as to thereby set and maintain the vehicle height at a predetermined level. The lines 3 and 4 are branched especially for the front and rear sides, respectively, from an air source 5 such as a compressor, pneumatic motor or air pump, and are interconnected with each other through change-over valves 6 and 7 which are installed in branch lines 3a and 4a, respectively. The line portions 3b and 4b downstream of the changeover valves 6 and 7 are further branched and connected to the air chambers 2 of the right and left shock absorbers 1A to 1D at the front and rear sides of the vehicle.

The line portions 3b and 4b of the front and rear air lines 3 and 4, which are downstream of the change-over valves 6 and 7, are interconnected through a communication line 8 equipped with a check valve 9. Check valve 9 is opened when the line pressure in the rear shock absorbers 1C and 1D is higher than that in the front side shock absorbers 1A and 1B over a predetermined range of an allowable difference in pressure between them to cause the rear side of the vehicle to be at an excessively high level in relation to the front side, due to some unusual condition, so that the excessive pressure may be released to the line 3B of the shock absorbers 1A and 1B from the line 4b through the communication line 8. In the predetermined range of the allowable difference in pressure, a normal function of the air-leveling system is performed by feeding the compressed air to, or discharging it from, the air chambers 2 through the change-over valves 6 and 7 in response to changes in levels of the vehicle to maintain the vehicle height at a predetermined level in the known manner. When the pressure in the line 4b is balanced with the pressure in the line 3b, check valve 9 is closed so that the two line pressures are controlled to have the heights of the front shock absorbers 1A and 1B and the rear shock absorbers 1C and 1D balanced, thereby controlling the difference in level at the front and rear sides thereof.

In the condition shown in FIG. 1, both of the change-over valves 6 and 7 are closed so that the air source 5 is disconnected from the lines 3b and 4b. Under such particular condition, if the pressure in line 4b should exceed that in line 3b over the predetermined range of the allowable difference, the check valve 9 is opened to regulate line pressure until a balance is established between the levels at the front and rear sides of the vehicle with some difference allowed within the predetermined range. On the other hand, if the vehicle height is lower than a predetermined level, the change-over valves 6 and 7 are automatically or manually opened by the detecting action of a vehicle height sensor to thereby connect the lines 3b and 4b with the air source 5 so that the compressed air is fed to the air chambers 2 so as to increase the vehicle height in the known manner. If, in such instance, the pressure in line 4b is higher than that in line 3b, the check valve 9 operates to balance the pressure in a manner similar to that described above.

Figure 2:
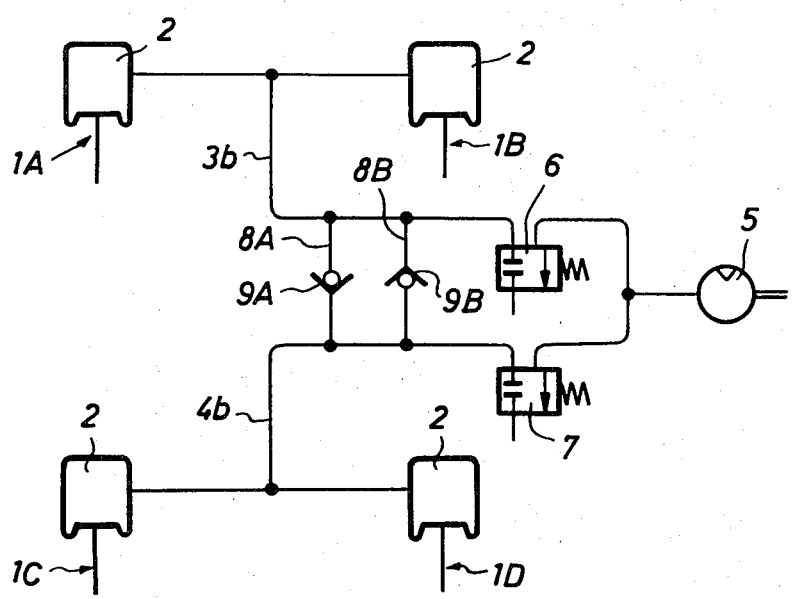
FIG. 2 is a diagrammatic illustration of a pneumatic circuit in accordance with a second embodiment of the present invention.

FIG. 2 shows a second embodiment of the present invention. Whereas the first embodiment shown in FIG. 1 is of the one-way type wherein the pressure at the rear side is released to the front side if it is higher, in the second embodiment, on the contrary, the lines 3b and 4b are interconnected through two juxtaposed communication lines 8A and 8B which are equipped with check valves 9A and 9B, respectively. The check valve 9A performs a function similar to that of check valve 9 in the first embodiment in that it is opened, if the rear side pressure is excessive, to release the rear side line pressure to the front side line 3b to thereby effect a balance therebetween. On the other hand, the operating direction of check valve 9B is reversed with respect to that of check valve 9A so that if the pressure in the front side line 3b is excessive, it is released to the rear side line 4b at the lower pressure side. As a result, should either of the front and rear lines 3b and 4b have excessive pressure, such pressure is released to the line 3b or 4b having a lower pressure to thereby balance the pressures in the front and rear lines 3b and 4b so that the front and rear vehicle heights can be maintained at a predetermined level. Because the second embodiment shown in FIG. 2 differs from the first embodiment shown in FIG. 1 only with respect to the lines 8A and 8B and check valves 9A and 9B, and is identical in other respects to the first embodiment as described in detail hereinabove, like parts are designated by like reference numerals.

Figure 3:
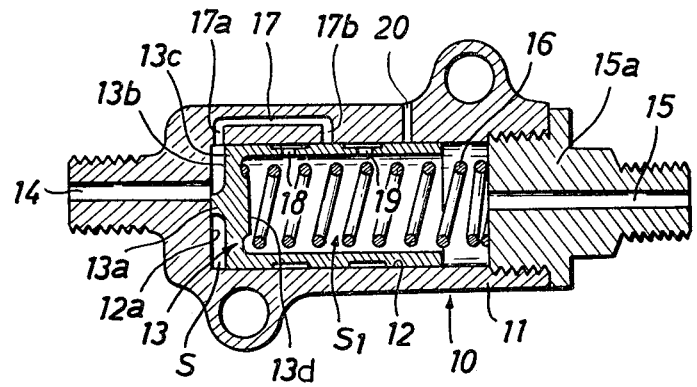
FIG. 3 is a longitudinal section showing one example of a check valve employed in the present invention.
Figure 4:
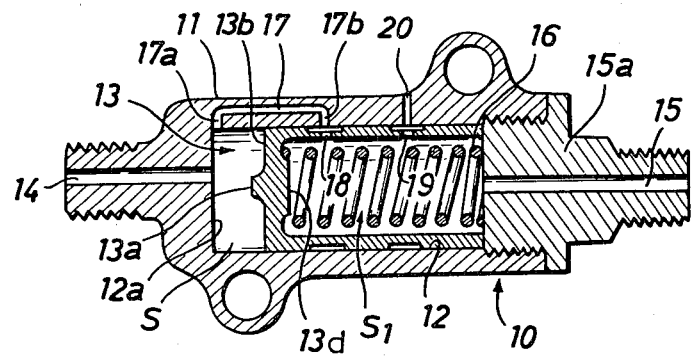
FIG. 4 depicts the check valve of FIG. 3 in a pressure regulated condition.

FIGS. 3 and 4 show an exemplary check valve construction in the form of a differential valve 10. The valve 10 has a body 11 formed with a cylinder 12 in which a closed bottom cylindrical piston 13 is slidably fitted. The body 11 is formed at the front and back of piston 13 with passages 14 and 15, the passage 15 being formed in a cap 15a for closing the cylinder 12. The passage 14 is connected with the line 4b leading to the air chambers 2 of the aforesaid rear side shock absorbers 1C and 1D, whereas the other passage 15 is connected with the line 3b leading to the air chambers 2 of the front side shock absorbers 1A and 1B. The piston 13 is normally urged in the cylinder 12 to the internal end face 12a at the left side by the resiliency of a spring 16, as shown in FIG. 3. The leading end of piston 13 is formed with a spacer protrusion 13a, which is in contact with the left internal end face 12a but away from the opening of passage 14 so as not to block same. Between the end face 12a and the end face 13b of piston 13 is formed a space S which extends around the circumference of the protrusion 13a and which communicates with the passage 14. At the end portion of cylinder 12 having the space S, in a circumferential portion of body 11, is formed a passage 17 which provides communication between the middle portion of the internal wall of cylinder 12 and the space S. The passage 17 is provided with an opening 17a which opens into the space S, and an opening 17b which opens at a middle portion of the inner cylinder wall. The piston 13 is formed in the circumferential wall thereof with annular grooves 18 and 19, which are positioned adjacent to each other, and the body 11 is formed with an air vent hole 20 which is substantially adjacent to the opening 17b of passage 17.

FIG. 3 shows the condition of the check valve when the front and rear pressures are balanced. The pressures in the passages 14 and 15 are exerted upon the corresponding sides of the head 13c of the piston 13, i.e., the left and right faces 13b and 13d of head 13c, thereby holding the piston 13 at the position shown in FIG. 3 with the aid of the force of spring 16, so that the front and rear pressures are balanced to maintain the vehicle height at a regulated level at the front and rear sides. If the rear side pressure, i.e., the pressure in passage 14 leading to line 4b, becomes sufficiently higher than the front side pressure to overcome the combined force of the pressure in the space $S_1$ at the right side of head 13c of piston 13 and the force of spring 16, the piston 13 is moved rightwardly, as shown in FIG. 4. As a result, the passage 14 communicates with the space $S_1$ in the piston 13 through the space S, the passage 17 and the groove 18. At the same time, the other groove 19 communicates with the air vent hole 20 to thereby provide communication between the space $S_1$ and the atmosphere. As a result, the pressure at the side of passage 14, i.e., the pressure in line 4b, leaks to the atmosphere. Concurrently, the pressure at the side of line 3b also leaks to the atmosphere through the passage 15 in the embodiment shown. Further, at the time when the pneumatic pressure in the rear side shock absorbers is balanced with that in the front side shock absorbers, the piston 13 is moved leftwardly with the aid of the force of spring 16 to thereby block the passages 14 and 15. As a result, the line pressures at the front and rear sides are controlled within the predetermined range of the allowable difference them so that the vehicle height is balanced at the front and rear sides.

Figure 5:
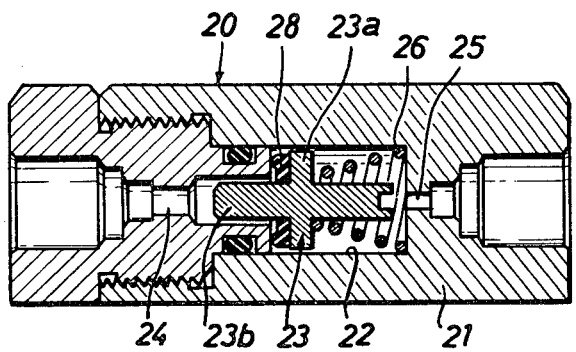
FIG. 5 is a longitudinal section showing another exemplary check valve construction for use in the present invention.

FIG. 5 shows a modified valve construction wherein the body 21 of a valve 20 is axially formed with two passages 24 and 25, and a valve member 23 having a flanged portion 23a is loosely fitted in a chamber 22 formed between the passages 24 and 25. The valve member 23 has one axial end thereof formed with a protrusion 23b which is loosely fitted in the passage 24. A seal element 28 is fitted on a circumferential base portion of the protrusion 23b. The valve member 23 is normally urged in the leftward direction in FIG. 5 by the resiliency of a spring 26, to thereby close the passage 24. The passage 24 is connected with line 4b leading to the chambers of the rear side shock absorbers, whereas the passage 25 is connected with line 3b leading to the chambers of the front side shock absorbers. If the pressure in the rear side passage 24 is excessive, the valve member 23 is moved rightwardly against the urging force of spring 26 to thereby open the passage 24 so that the passages 24 and 25 communicate through the chamber 22 to thereby release the pressure to passage 25. At the time that the pressures at both sides become equal, the passage 24 is closed by the action of spring 26 on valve member 23. Thus, the excessive pressure at the rear side is corrected so as to establish a pressure balance between the front and rear sides.

In the foregoing embodiments, a differential valve is described for use as the check valve in accordance with the invention, however, it will be understood that such valve construction is merely exemplary, and any suitable check valve may be employed.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. An air-leveling system for a vehicle having front and rear wheels, comprising:
   shock absorber means for respectively suspending both said front and rear wheels;
   air source means;
   air chamber means provided in each said shock absorber means;
   first conduit means for feeding pneumatic pressure from said air source means to said air chamber means of said shock absorber means of said front wheels;
   second conduit means for feeding pneumatic pressure from said air source means to said air chamber means of said shock absorber means of said rear wheels;
   at least one check valve means, provided in third conduit means for providing communication between said first feeding conduit means and said second feeding conduit means;
   said check valve means being normally closed when the pressures in said first conduit means and said second conduit means are substantially balanced; and
   wherein said check valve means moves to an open position thereof when said pressure in said air chamber means of said shock absorber means of said rear wheels becomes higher than pressure in said air chamber means of said shock absorber means of said front wheels over a predetermined range of an allowable difference in pressure between them, so as to directly release an excessive pressure in said second conduit means to said first conduit means through said third conduit means and said open check valve means, whereby pressures in said first and second conduit means are balanced.

2. An air-leveling system according to claim 1, wherein:
   said system further includes valve means adapted to alternatively permit or block flow of said pneumatic pressure from said air source means to said first and second conduit means, and said third conduit means is connected with said first and second conduit means downstream of said valve means.

3. An air-leveling system for a vehicle having front and rear wheels, comprising:
   shock absorber means for respectively suspending both said front and rear wheels;
   air source means;
   air chamber means provided in each said shock absorber means;
   first conduit means for feeding pneumatic pressure from said air source means to said air chamber means of said shock absorber means of said front wheels;
   second conduit means for feeding pneumatic pressure from said air source means to said air chamber means of said shock absorber means of said rear wheels;
   at least one check valve means, connected between said first conduit means and said second conduit means, for releasing pressure in said air chamber means of said shock absorber means of said rear wheels when said pressure becomes higher than pressure in said air chamber means of said shock absorber means of said front wheels over a predetermined range of an allowable difference in pressure between them;
   said check valve means being provided in third conduit means for providing communication between said first conduit means and said second conduit means;
   a second check valve means being provided in fourth conduit means for providing communication between said first conduit means and said second conduit means; and
   said second check valve means being adapted to release pressure in said air chamber means of said shock absorber means of said front wheels when said pressure becomes higher than pressure in said air chamber means of said shock absorber means of said rear wheels.

4. An air-leveling system according to claim 3, wherein said check valve means comprises:
   a first passage connected with one of said first and second conduit means so as to take in pressure therefrom;
   a second passage connected with the other of said first and second conduit means so as to take in pressure therefrom;
   a third passage for providing communication between said first passage and said second passage;
   a fourth passage for venting to the atmosphere;
   a cylinder interposed between said first passage and said second passage;
   a piston slidably fitted in said cylinder;
   spring means for axially urging said piston;
   said piston being normally held, by combined forces of said spring means and said pressure in said second passage, in a position blocking said third and fourth passages; and said piston being movable against said combined forces of said spring means and said pressure in said second passage when said pressure in said first passage becomes higher than said combined forces so as to permit communication between said first passage and said second passage through said third passage, and to permit venting of an excessive pressure in said first passage to the atmosphere through said fourth passage.

5. An air-leveling system according to claim 3, wherein said check valve means comprises:
 a first passage connected with one of said first and second conduit means so as to take in pressure therefrom;
 a second passage connected with the other of said first and second conduit means so as to take in pressure therefrom;
 a chamber defined between said first passage and said second passage;
 a valve member fitted in said chamber;
 spring means for urging said valve member;
 said valve member being normally held, by combined forces of said spring means and said pressure in said second passage, in a position closing said first passage; and
 said valve member being movable, when said pressure in said first passage becomes higher than said combined forces of said spring means and said pressure in said second passage, to open said first passage so as to permit communication between said first passage and said second passage through said chamber.

6. An air-leveling system for a vehicle having front and rear wheels, comprising:
 shock absorber means for respectively suspending both said front and rear wheels;
 air source means;
 air chamber means provided in each said shock absorber means;
 first conduit means for feeding pneumatic pressure from said air source means to said air chamber means of said shock absorber means of said front wheels;
 second conduit means for feeding pneumatic pressure from said air source means to said air chamber means of said shock absorber means of said rear wheels;
 at least one check valve means, connected between said first conduit means and said second conduit means, for releasing pressure in said air chamber means of said shock absorber means of said rear wheels when said pressure becomes higher than pressure in said air chamber means of said shock absorber means of said front wheels over a predetermined range of an allowable difference in pressure between them;
 said check valve means comprising:
 a first passage connected with one of said first and second conduit means so as to take in pressure therefrom;
 a second passage connected with the other of said first and second conduit means so as to take in pressure therefrom;
 a third passage for providing communication between said first passage and said second passage;
 a fourth passage for venting to the atmosphere;
 a cylinder interposed between said first passage and said second passage;
 a piston slidably fitted in said cylinder;
 spring means for axially urging said piston;
 said piston being normally held, by combined forces of said spring means and said pressure in said second passage, in a position blocking said third and fourth passages; and
 said piston being movable against said combined forces of said spring means and said pressure in said second passage when said pressure in said first passage becomes higher than said combined forces so as to permit communication between said first passage and said second passage through said third passage, and to permit venting of an excessive pressure in said first passage to the atmosphere through said fourth passage.

7. An air-leveling system for a vehicle having front and rear wheels, comprising:
 shock absorber means for respectively suspending both said front and rear wheels;
 air source means;
 air chamber means provided in each said shock absorber means;
 first conduit means for feeding pneumatic pressure from said air source means to said air chamber means of said shock absorber means of said front wheels;
 second conduit means for feeding pneumatic pressure from said air source means to said air chamber means of said shock absorber means of said rear wheels;
 at least one check valve means, connected between said first conduit means and said second conduit means, for releasing pressure in said air chamber means of said shock absorber means of said rear wheels when said pressure becomes higher than pressure in said air chamber means of said shock absorber means of said front wheels over a predetermined range of an allowable difference in pressure between them;
 said check valve means comprising:
 a first passage connected with one of said first and second conduit means so as to take in pressure therefrom;
 a second passage connected with the other of said first and second conduit means so as to take in pressure therefrom;
 a chamber defined between said first passage and said second passage;
 a valve member fitted in said chamber;
 spring means for urging said valve member;
 said valve member being normally held, by combined forces of said spring means and said pressure in said second passage, in a position closing said first passage; and
 said valve member being movable, when said pressure in said first passage becomes higher than said combined forces of said spring means and said pressure in said second passage, to open said first passage so as to permit communication between said first passage and said second passage through said chamber.

8. An air-leveling system according to claim 3, 6 or 7, wherein:
 said system further includes valve means adapted to alternatively permit or block flow of said pneumatic pressure from said air source means to said first and second conduit means, and said third conduit means is connected with said first and second conduit means downstream of said valve means.

* * * * *